United States Patent [19]
Kovacs

[11] 3,795,842
[45] Mar. 5, 1974

[54] CIRCUIT FOR MONITORING VOLTAGES IN A POLYPHASE ELECTRICAL SUPPLY

[75] Inventor: Frank I. Kovacs, Bisbee, Ariz.

[73] Assignee: Univ. Amp, Inc., Bisbee, Ariz.

[22] Filed: June 9, 1972

[21] Appl. No.: 261,351

[52] U.S. Cl. ............. 317/27 R, 317/31, 317/335 C, 317/46
[51] Int. Cl. ............................................. H02h 3/24
[58] Field of Search..... 317/33 SC, 31, 46, 27 R, 48

[56] References Cited
UNITED STATES PATENTS

| | | | |
|---|---|---|---|
| 3,428,865 | 2/1969 | Opad | 317/335 C |
| 3,569,781 | 3/1971 | Strachan | 317/335 C |
| 3,555,362 | 1/1971 | Quinn | 317/31 |

Primary Examiner—William M. Shoop, Jr.
Assistant Examiner—Harvey Fendelman
Attorney, Agent, or Firm—Herbert E. Haynes, Jr.

[57] ABSTRACT

A triac, a pair of diacs, a neon bulb and a photocell monitor all of the voltages in a polyphase electrical supply and disconnect a load when any of the voltages decrease below a predetermined threshold value.

2 Claims, 1 Drawing Figure

PATENTED MAR 5 1974　　　　　　　　　　　　　　　3,795,842
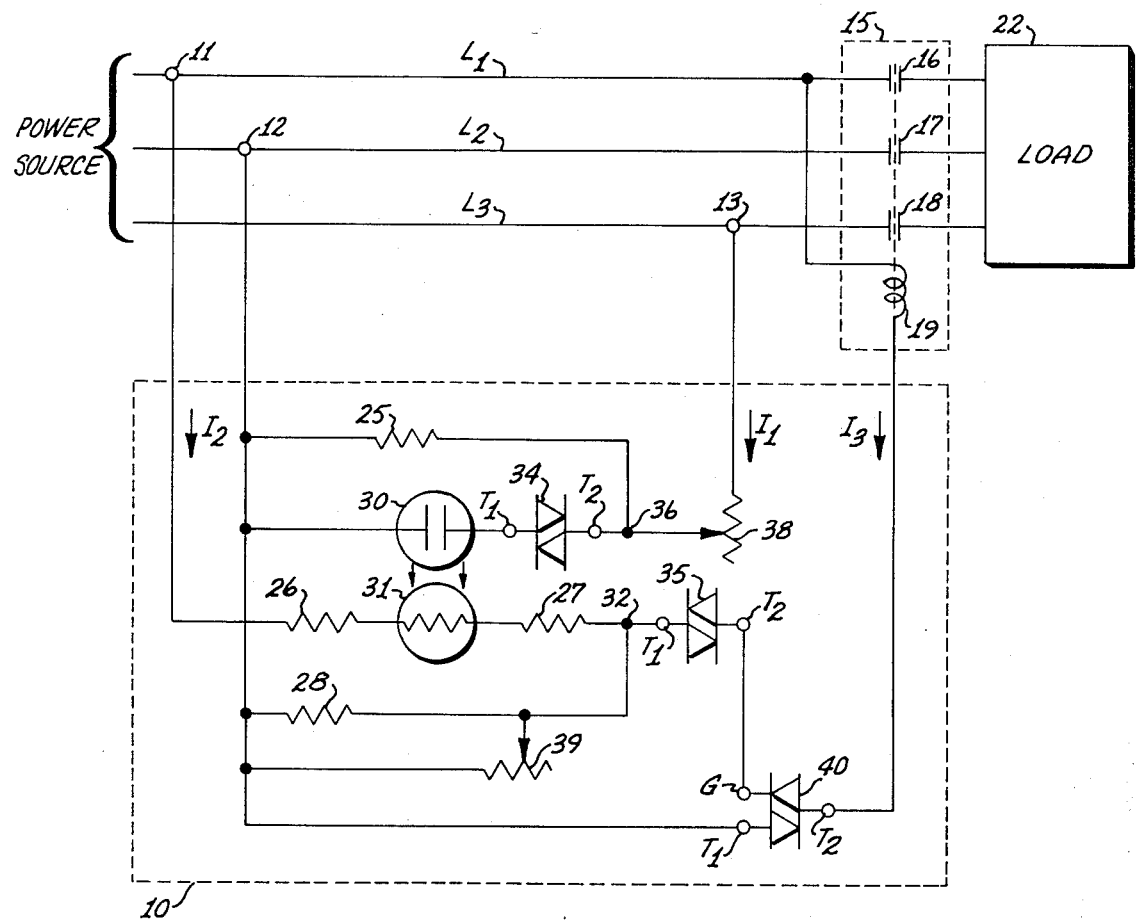

3,795,842

CIRCUIT FOR MONITORING VOLTAGES IN A POLYPHASE ELECTRICAL SUPPLY

BACKGROUND OF THE INVENTION

The present invention pertains to a circuit which uses relatively few components to monitor voltage in a polyphase electrical supply and to cause a load to be disconnected from the supply when any of the voltages in the supply decrease below a threshold value.

Polyphase power supplies such as a three-phase 220 volt system are commonly used to supply electrical power to operate three-phase motors in many types of industries. Often these motors operate 24 hours a day in a remote location where they can not be observed by any operator. If one phase of the power should fail the current in the other phases of the motor would increase so that heat generated by the increased current would quickly destroy the motor. If the voltage on the three-phase supply decreases only a small amount the speed of the motor decreases causing the counter electromotive force developed by the motor to decrease and causing motor current to increase. This increase in current would also generate heat which could destroy the motor.

Many attempts have been made to develop circuits to monitor the voltages in polyphase power supplies and to disconnect the loads from the supplies when one phase of voltage is lost or when voltages from the supplies decrease below a predetermined value. Some prior art circuits use electric heaters in series with the motor. When current in the motor increases the temperature of the heaters increases causing a safety switch between the motor and the polyphase supply to open. These heaters work fairly well when current increases slowly, but a sudden increase in motor current can destroy a motor before the heater can open the safety switch. Relays have been used, but relays have proven to be unreliable as voltage required to operate a relay varies over a wide range of values.

Another type of prior art device is disclosed in U. S. Pat. No. 3,242,383 issued Mar. 22, 1966 to Henry L. Opad. This device is coupled to the individual phases of a three-phase power source and causes a capacitor to charge when all voltages are near normal. When any of the voltages decrease the capacitor starts to discharge. When the voltage across the capacitor decreases to a predetermined value another portion of the circuit causes current from the capacitors to flow through a coil and to trip a circuit breaker. The time delay in discharging the capacitor may cause a motor to be destroyed before the circuit breaker can disconnect the motor.

Another prior art circuit by Henry L. Opad is disclosed in U. S. Pat. No. 3,428,865 issued Feb. 18, 1969. This circuit has the disadvantage of requiring a separate 120v A.C. in addition to the 220 three-phase supply. In many remote sites the 120v source is not available. Another disadvantage is that component values in this circuit are fairly critical so that it may be necessary to change values if this circuit were used in a remote location where the three-phase voltage is not 220 volts. Often voltages in remote locations are not 220 volts due to a voltage drop in relatively long supply lines.

The present invention overcomes the disadvantages of the prior art by providing a fast-acting circuit for monitoring voltages in a polyphase electrical supply and for quickly disconnecting a motor or other load when any of voltages decrease below a threshold value.

It is, therefore, an object of this invention to provide a new and improved circuit for monitoring a polyphase electric power supply.

Another object of this invention is to provide a fast-acting circuit for monitoring a polyphase electric power supply.

A further object of this invention is to provide a circuit having increased sensitivity to changes in line voltage.

Still another object of this invention is to provide a monitoring circuit which can be adjusted to operate with different voltages in polyphase power supplies.

SUMMARY OF THE INVENTION

The foregoing objects are achieved in accordance with one embodiment of the present invention by using a neon bulb and a diac to monitor the voltage between two phases of a polyphase power supply. A second diac, a triac and a photocell monitor the voltage between another two phases. The neon bulb and the photocell are coupled together so that when voltage drops in either the neon bulb circuit or in the photocell circuit, the triac will disconnect the load from the power supply.

BRIEF DESCRIPTION OF THE DRAWING

The drawing illustrates a circuit diagram of one embodiment of the present invention.

DESCRIPTION OF THE PREFERRED EMBODIMENT

The circuit 10 for monitoring voltages in a polyphase electrical circuit is shown in the drawing as being coupled by input terminals 11, 12, and 13 to the individual lines $L_1$, $L_2$, and $L_3$ of a conventional three-phase power line. The three-phase power line is coupled through a starter switch or contactor 15 to a load 22. The load 22 may be a three-phase electric motor or other device. The contactor 15 includes a coil 19 operatively coupled to a plurality of switches 16, 17, and 18. The switches 16 – 18 are normally open and are closed when current flows through the coil 19.

The contactor 15 is normally used in prior art circuits which do not employ the circuit 10 of the present invention. In these prior art circuits the coil 19 is usually connected between power line $L_1$ and $L_2$.

The circuit 10 senses the value of voltages on power lines $L_1$, $L_2$, and $L_3$ at input terminals 11, 12, and 13 and provides a current through the circuit 10 to the coil 19 when the sensed voltages have a normal value. When the voltages at one or more of the input terminals decreases below a predetermined threshold value, current supplied to the coil 19 through the circuit 10 drops and the switches 16, 17, and 18 quickly open.

The circuit 10 which senses the value of the input voltages includes resistors 25 – 28, a neon bulb 30, a photocell 31, a pair of diacs 34 and 35, a pair of rheostats 38 and 39 and a triac 40. A diac is a semiconductor device having first and second terminals $T_1$ and $T_2$. The semiconductor device has the characteristic of a pair of diodes connected between $T_1$ and $T_2$ with the anode of the first diode and the cathode of the second diode connected to $T_1$. The cathode of the first diode and the anode of the second diode are connected to $T_2$. Normally the diac cannot conduct current between terminals until a voltage greater that a threshold value exists between the terminals. When the voltage between terminals exceeds the threshold value the diac "fires", i.e. is rendered conductive and a current flows between terminals. Current may flow from $T_1$ to $T_2$ or from $T_2$ to $T_1$ depending upon the polarity of the voltage between the terminals.

A triac is a semiconductor device having first and second terminals ($T_1$ and $T_2$) and a gate. Normally, the triac cannot conduct current between the terminals until a pulse of current greater than a threshold value flows between the gate and one of the terminals. If a voltage difference exists between $T_1$ and $T_2$ when the pulse of current flows in the gate, the triac "fires", i.e. is rendered conductive and a current will flow between terminals. Current may flow from $T_1$ to $T_2$ or from $T_2$ to $T_1$ depending upon the polarity of voltage between the terminals. Either a positive or a negative gate current will cause the triac to fire. Once current flow between terminals commences, the gate has no further control over such current flow. Current flow between terminals in the triac can be terminated only by reducing the current between terminals below a "holding" or minimum current value.

The operation of the circuit will now be described in connection with the drawing. When voltages at terminals 11-13 have a normal value a current $I_1$ flows from terminal 13 through rheostat 38, diac 34 and neon bulb 30 to terminal 12. Current $I_1$ causes the neon bulb 30 to light. Bulb 30 is mounted adjacent photocell 31 so that light from the bulb energizes the photocell 31 causing the resistance of the photocell to be low. When the resistance of the cell is low a current $I_2$ flows from terminal 11, through resistor 26, photocell 31, resistor 27, diac 35, from the gate to terminal $T_1$ of the triac 40, to terminal 12. Current $I_2$ causes the trac to be conductive so that a current $I_3$ flows from terminal 11 through coil 19, from terminal $T_2$ to $T_1$ of the triac 40, to terminal 12. Current $I_3$ energizes the coil 19 so that the switches 16-18 of contactor 15 are closed. When the A. C. polarities at input terminals 11-13 reverse the current $I_1$ - $I_3$ flow in the reverse directions.

When the voltage between input terminals 12 and 13 decreases below a predetermined value diac 34 is nonconductive so that current $I_1$ no longer flows through bulb 30. When current does not flow through the bulb, the photocell 31 has a high value of resistance so that a large portion of the voltage between terminals 11 and 12 is dropped across photocell 31. The voltage across diac 35 decreases so that diac 35 is nonconductive. When diac 35 is nonconductive current $I_2$ no longer flows through gate $T_1$ of triac 40. Triac 40 is nonconductive so that current $I_3$ no longer flows through coil 19. Coil 19 is deenergized and the switches 16 – 18 are opened. Thus, if the voltage between terminals 12 and 13 drops the switches quickly open even if the other voltage is normal. Resistor 25 and rheostat 38 provide a voltage divider between terminals 12 and 13. When the value of resistance in rheostat 38 is decreased a larger portion of the voltage is dropped across resistor 25 so that the voltage between terminals 12 and 13 must decrease to a lower value before triac 34 is rendered nonconductive. The voltage at which the contactor is deenergized is determined by the setting of rheostat 38.

When the voltage between input terminals 12 and 11 decreases below a predetermined value the voltage across diac 35 is so low that diac 35 is nonconductive. When diac 35 is non-conductive current $I_2$ no longer flows between the gate and $T_1$ of triac 40 so triac 40 is nonconductive. Current $I_3$ no longer flows in coil 19 and the contactor 15 is deenergized. Thus, if the voltage between terminals 12 and 11 drops the switches open quickly even if the other voltages are normal. Rheostat 39 and resistor 28 in parallel, are in series with resistor 17, photocell 31 and resistor 26 to provide a voltage divider between terminals 11 and 12. The voltage across resistor 28 and rheostat 39 is also between $T_1$ of diac 35 and $T_1$ of triac 40. When the value of rheostat 39 is increased the voltage across diac 35 increases so that diac 35 will be rendered conductive by a lower than normal value of voltage between terminals 12 and 11. The setting of rheostat 39 determines the value of voltage at which the contactor 15 is energized.

While the principles of the invention have now been made clear in an illustrative embodiment, there will be many obvious modifications of the structure, proportions, material and components without departing from those principles. The appended claims are intended to cover any such modifications.

What I claim is:

1. A circuit for monitoring voltages in a polyphase electrical supply and for protecting a load from a decrease in voltage on any phase, said circuit being designed for use with a contactor having a coil and first, second and third switches, said circuit comprising:

first, second and third input terminals, each of said switches being connected between said load and a corresponding one of said input terminals;

a triac having first and second terminals and a gate, said coil of said contactor being connected between said first input terminal and said first terminal of said triac, said second terminal of said triac being connected to said second input terminal;

a photocell;

a neon bulb, said bulb being mounted adjacent said photo-cell so that light from said bulb activates said photocell when said bulb is energized;

first and second diacs each having first and second terminals;

first and second rheostats, said neon bulb being connected between said first terminal of said first diac and said second input terminal, said first rheostat being connected between said second terminal of said first diac and said third input terminal;

first and second resistors, said first resistor being connected between said second input terminal and said second terminal of said first diac, said second resistor being connected between said first terminal of said second diac and a first lead of said photocell, a second lead of said photocell being coupled to said first input terminal, said second terminal of said second diac being connected to said gate of said triac, said second rheostat being connected between said second input terminal and said first terminal of said second diac.

2. A circuit for monitoring voltages in a polyphase electrical supply as defined in claim 1 including:

a third resistor, said third resistor being connected between said second input terminal and said first terminal of said second diac.

* * * * *